US005524182A

United States Patent [19]
Chari et al.

[11] Patent Number: 5,524,182
[45] Date of Patent: Jun. 4, 1996

[54] SYSTEM AND METHOD FOR COMPRESSING AND DECOMPRESSING FONTS BASED UPON FONT STROKE REGULARITIES

[75] Inventors: Rangarajan T. Chari; Charles J. Blackbird, both of Boise, Id.

[73] Assignee: Hewlett-Packard Company, Palo Alto, Calif.

[21] Appl. No.: 361,071

[22] Filed: Dec. 21, 1994

[51] Int. Cl.$^6$ .................................................. G06K 15/00
[52] U.S. Cl. ........................................ 395/110; 395/114
[58] Field of Search ...................... 395/110, 114, 395/150, 151, 102, 112; 382/244–247, 299, 243, 251, 253; 358/261.1, 261.2, 261.3, 433; 400/70, 61, 55, 72; 345/143, 142, 128, 129, 130

[56] References Cited

U.S. PATENT DOCUMENTS

| | | | |
|---|---|---|---|
| 4,353,653 | 10/1982 | Zimmerman | 400/70 |
| 4,633,505 | 12/1986 | Marshall | 382/56 |
| 4,881,069 | 11/1989 | Kameda et al. | 340/735 |
| 5,056,154 | 10/1991 | Aono et al. | 382/56 |
| 5,117,371 | 5/1992 | Kristen et al. | 395/150 |
| 5,199,803 | 4/1993 | Shimizu et al. | 395/110 |
| 5,272,768 | 12/1993 | Bauman et al. | 395/110 |

OTHER PUBLICATIONS

"Neural Network Learning And Expert Systems", Stephen L. Gallant, The MIT Press, 1993, p. 148.

"Dot Pattern Processing Using Voronoi Neighborhoods", Narendra Ahuja, IEEE Transactions on Pattern Analysis and Machine Intelligence, vol. PAMI-4, No. 3, May, 1982, pp. 336–343.

"Radar Signal Categorization Using a Neural Network", James A. Anderson et al., IEEE, vol. 78, No. 10, Oct. 1990, pp. 1646–1657.

"The Relative Neighbourhood Graph Of A Finite Planar Set", Godfried T. Toussaint, Pattern Recognition, vol. 12, 1980, pp. 261–268.

"The Relative Neighborhood Graph, With An Application To Minimum Spanning Trees", Kenneth J. Supowit, Journal of the Association for Computing Machinery, vol. 30, No. 3, Jul. 1983, pp. 428–448.

"Connect–The–Dots: A New Heuristic", Joseph O'Rourke et al., Computer Vision, Graphics, and Image Processing, 39, 1987, 258–266.

"The Brush–Trajectory Approach To Figure Specification: Some Algebraic–Solutions", Pijush K. Ghosh et al., ACM Transactions on Graphics, vol. 3, No. 2, Apr. 1984, pp. 110–134.

(List continued on next page.)

*Primary Examiner*—Arthur G. Evans

[57] ABSTRACT

A method for compressing a typographic font and recovering the original font from the compressed font, first extracts the outline of each glyph in the font in turn, and analyzes the outline to find all the dominant points. The curvature and slope(s) at the dominant points are collected for clustering at the font level. The dominant points are matched algorithmically and the outline is dissected into strokes. A normalized stroke descriptor is computed for each stroke so that similarities between strokes that are related by translation, rotation, reflection and scaling can be made explicit. Thus a stroke is described by its normalized descriptor along with translation, rotation, reflection and scaling parameters. After each glyph outline has been so analyzed, the curvature and slopes at dominant points are clustered. Also, the normalized stroke descriptors are classified so as to put similar strokes into the same class. Each of these classes is assigned a unique identifier. A font descriptor is created including: the curvature cluster centers and spreads, the slope cluster centers and spreads, the cluster centers and spreads of each free vertex of the normalized stroke descriptor, a description of each glyph in terms of its Unicode (if any) and a graph showing the relationship of its strokes. Each of the strokes is represented by the cluster numbers of each of the components of its normalized descriptor and the transformations required to instantiate it.

11 Claims, 4 Drawing Sheets

OTHER PUBLICATIONS

"Off–Line Arabic Character Recognition", Habib Goraine et al., Computer, Jul. 1992, pp. 71–74.

"Reading Handwritten Digits: A Zip Code Recognition System", Ofer Matan et al, Computer, Jul. 1992, pp. 59–62.

"Hidden Markov Models For Character Recognition", J. A. Vlontzos et al., IEEE Transactions on Image Processing, vol., 1, No. 4, Oct. 1992, pp. 539–543.

"Shape Matching Using Curvature Processes", Evangelos E. Milios, Computer Vision, Graphics, and Image Processing, 47, 1989, pp. 203–226.

"Invariant Object Recognition Using A Distributed Associative Memory", Harry Wechsler et al., American Institute of Physics, 1988.

SYSTEM AND METHOD FOR COMPRESSING AND DECOMPRESSING FONTS BASED UPON FONT STROKE REGULARITIES

FIELD OF THE INVENTION

This invention relates to compression and decompression of the data used to describe a font, and more particularly, to a system and method for using stroke recurrences in fonts to encode and decode the glyphs comprising the font with minimal loss of information.

BACKGROUND OF THE INVENTION

The transmission of textual information in documents employing non-default fonts currently requires that one of three conditions be fulfilled: that bitmap images of glyphs be sent from source to destination; that the fonts used be stored at the destination; or that the fonts referenced be physically included in the document. Fonts are typically large in terms of the number of bytes they occupy, even when conventional (non-font-specific) compression techniques are used. Requiring that the font be stored in the target device limits the user to a small "standard" set of fonts. It is not guaranteed that any font the user prefers to use can be elicited at any given target device.

The major drawback with the bitmap representation is that for each size of glyph, a different bitmap has to be sent, leading to a large increase in the size of the document. While useful for such devices as facsimile machines, the bitmap representation is unsuitable in situations requiring document editability. The problem of encoding, transmitting, and decoding font information so that the same font-related effects are achieved at either end is hereafter called the problem of font portability. The font portability problem must be solved if the document portability problem is to be solved. This invention addresses the problem of font portability.

The prior art in the field of font portability ranges from storage at every site of a standard set of fonts and an optional set of additional fonts (in uncompressed or slightly compressed form), to a number of methods of font synthesis. Some font creation techniques distort existing fonts or interpolate between existing fonts. Examples of this category are the Adobe Acrobat™ and Ares Font Chameleon™. Programs in this category do not claim to be able to create any given font from certain others, just to be able to derive potentially interesting fonts from others.

A second category of techniques construct new fonts by using certain parameterized shape elements. The leading example of this category is METAFONT, authored by Knuth ("The METAFONT Book", Addison-Wesley, 1986). METAFONT is a special-purpose programming language in which a font can be programmed from bottom-up, by first programming parameterized elementary shapes such as serifs and bowls. In practice, it has been found extremely difficult to design fonts using the METAFONT system.

A recent technique of interest is ElseWare Corporation's Infinifont system. Central to this system is a file or database called the 'terafont', which is the repository of all knowledge about component parts of glyphs and their variants in a whole class of fonts. The store is created manually and consists of data and functions required to create glyphs. An interpreter called the Infinifont synthesis engine interprets the functions in the terafont to create glyphs. The synthesis is modulated by a "PANOSE" file, which contains parameters, at levels from coarse to fine, and pertaining to both individual characters and the whole font.

The problems with this technique are many:

1. The set of fonts that can be replicated has to be decided at the outset, although in theory only a new PANOSE file has to be created for a new font.

2. As the requirement for accuracy of replication increases, the PANOSE and terafont files increase nonlinearly in size.

3. The target device is required to store the whole terafont (contains data for fonts it may never need).

4. There is no algorithm for creating the PANOSE file for a given font—it has to be created manually and heuristically.

5. The terafont versions at the source and destination have to be identical, and so do the interpreters.

6. For synthesizing fonts in a new script, a new terafont has to be created.

Accordingly, it is an object of this invention to provide an algorithm for creating font descriptors which adhere to certain syntactic rules, and are small enough that it is practical to embed them in text for transmission.

It is another object of this invention to provide an algorithm for recovering fonts from such font descriptors with negligible data loss.

It is still another object of this invention that the algorithms for font description and reconstruction be applicable, without modification, to any stroke-based font, regardless of script.

SUMMARY OF THE INVENTION

A method for compressing a typographic font and recovering the original font from the compressed font, first extracts the outline of each glyph in the font in turn, and analyzes the outline to find all the dominant points. The curvature and slope(s) at the dominant points are collected for clustering at the font level. The dominant points are matched algorithmically and the outline is dissected into strokes. A normalized stroke descriptor is computed for each stroke so that similarities between strokes that are related by translation, rotation, reflection and scaling can be made explicit. Thus a stroke is described by its normalized descriptor along with translation, rotation, reflection and scaling parameters. After each glyph outline has been so analyzed, the curvature and slopes at dominant points are clustered. Also, the normalized stroke descriptors are classified so as to put similar strokes into the same class. Each of these classes is assigned a unique identifier. A font descriptor is created including: the curvature cluster centers and spreads, the slope cluster centers and spreads, the cluster centers and spreads of each free vertex of the normalized stroke descriptor, a description of each glyph in terms of its Unicode (if any) and a graph showing the relationship of its strokes. Each of the strokes is represented by the cluster numbers of each of the components of its normalized descriptor and the transformations required to instantiate it. The invention replaces font references (such as "standard" font names) by font descriptors of the type described above. The original font can be recovered with minimal loss from the font descriptor by using a reconstruction algorithm.

DETAILED DESCRIPTION THE INVENTION

Prior to describing the details of the invention, certain terms used hereinbelow will be defined:

Glyph: A graphical representation, in terms of an outline (see below) of a character or symbol.

Character: An abstraction which has a code in one or more character encoding schemes, such as ASCII, Unicode or JIS. A character may be mapped to a symbol.

Symbol: An abstract shape associated with one or more glyphs.

Unicode: A standard encoding scheme which maps characters and symbols in most extant scripts into two-byte codes.

Contour: A closed boundary curve in a glyph.

Outline: A set of non-intersecting, possibly nested, contours of a glyph along with their containment information.

Curvature: Informally, the inverse of the radius of the circle that most closely approximates a curve at a given point; when traversing a glyph contour with ink to the left, curvature is assigned a negative sign if the curve bends to the right, and a positive sign if it bends to the left.

Dominant Point: Either: (a) a positive local maximum of curvature (that occurs at an L-junction or a dead end); or: (b) a negative local minimum of curvature (that occurs in T-, X-, Y- or other n-way junctions).

Minimal Point: A point on a contour where the absolute value of curvature is locally a minimum. Between two consecutive dominant points on a contour, there is exactly one minimal absolute value of curvature.

Voronoi Diagram: on a planar set of points V is a tessellation of the plane made up of convex polygons, with a single point in each polygon, such that the interior of each polygon is closer to the point in it than to any other point in V.

Delaunay Triangulation: The dual of the Voronoi Diagram; an edge is drawn between p and q, elements of V, if the Voronoi polygons of p and q share a side.

Relative Neighborhood Graph: The relative neighborhood graph (RNG) on a set of points is a graph in which two points p and q in a set are connected if there is no other point of the set in lune (p, q), i.e., the intersection of two circles of radius pq centered at p and q respectively.

Matching Points: Two points A and B in a glyph are said to match each other if they could be corresponding ends of a stroke. Operationally, two points A and B match if (i) at least one of them is a dominant point, (ii) they are neighbors in the relative neighborhood graph of dominant and minimal points of the glyph, (iii) they are mutually to the left of each other, and (iv) the line segment AB does not intersect any contour of the glyph. A dominant point that matches no other point matches itself. A dominant point may match more than one point.

Stroke: Let all matching pairs of points be connected by line segments. A stroke is an area swept by a line segment which is initially and finally coincident with line segments connecting pairs of matching dominant points, subject to the following conditions:

1. The ends of the line segment always touch either the boundary of the glyph or a line segment connecting a pair of matching points;

2. The line segment lies entirely within the glyph ("in the ink"); and

3. The line segment never intersects any line segment connecting a pair of matching points.

Regularity: The recurrence in the outlines of glyphs in a font, of strokes (perhaps rotated, translated, scaled and/or reflected), curvature and slope values at dominant points, and stroke thicknesses at junctions.

Analysis of a Glyph Outline

Figure 1:
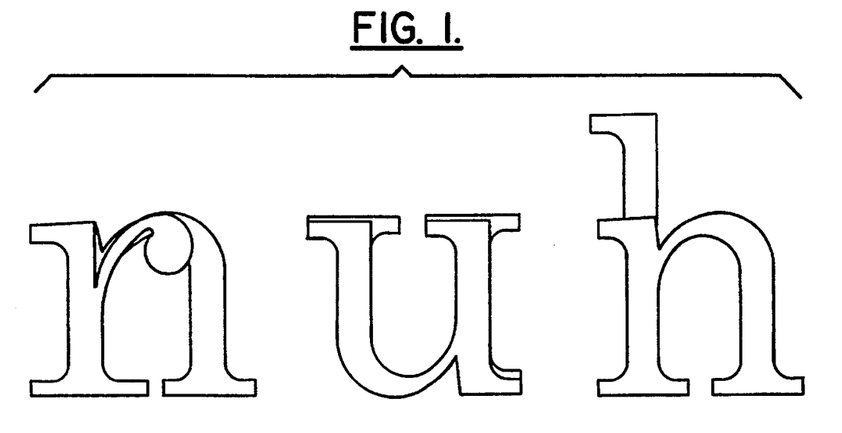
FIG. 1 illustrates a series of glyphs from a selected font, indicating regularities that exist between the glyphs.

As will be understood from the description below, a central thesis underlying this invention is that every font contains many regularities, i.e., recurrences of strokes, counters, etc. These recurrences may be exact stroke repetitions or scaled, rotated, translated and/or reflected instances of strokes. As shown in FIG. 1 for an exemplary font, the vertical stem of a lower case r overlaps almost perfectly with the left vertical stem of a lower case n. Likewise, an inverted lower case n bears substantial likeness to a non-inverted lower case u. In a similar vein, a lower case n is identical to a lower case h with a truncated ascender. It is such regularities which enable the compression of fonts as described below.

Most glyphs are made as if by brushes, and the movement of the brush creates a generalized cylinder in the plane, with two boundary lines "following" each other. The figure can be "cut" where the brush takes a sharp turn or the sweep of the brush meets with another coming from another direction. Further, in a font, the same set of brushes and the same pressure patterns and styles of moving and turning the brush are employed throughout. The brush analogy also extends to modern non-script fonts. In this invention the fact is exploited that most fonts are based on brush movements (with a limited number of brushes). The geometrical and visual properties of brush figures allow discovery of recurrences and redundancies in fonts, which, in turn, allow for compression.

As a side-effect of the above-described font characteristics, features such as curvature and slope(s) at dominant points and the thickness of strokes at junctions fall into a small number of tight clusters. The presence of these recurrences is what gives a font its coherence and the individual glyphs their family resemblance to one another.

A contour of a glyph is generally represented as a closed, piecewise analytic, parametric curve such as a B-spline, a chain of quadratic or cubic Bezier curves, or a circular arc—straight line sequence. The meeting points of the segments of the curve are called joints. At most joints, continuity, at least up to the first derivative, is maintained. At corners and cusps, however, there are slope discontinuities. In a given contour, a corner or cusp is evidenced by an angle of at least 7° between tangents to the adjacent segments at the joint.

The slope and curvature at a given point on a piecewise analytic curve can be found by locating the segment on which the given point lies, retrieving the parameters corresponding to that segment, and applying the formulae for tangent and curvature. If r(t) is the focus of the curve as a function of parameter t, $r' = dr(t)/dt$ is the tangent to the curve at t and $(r'(t) X r''(t))/r'(t)^3$ gives the curvature, 'X' signifies the vector cross product; $r'(t)$ is the first derivative; $r''(t)$ is the second derivative of r with respect to t; and $|v|$ means the absolute magnitude of the vector v.

The convention adopted for the direction of traversal of a contour is such that "ink" (i.e., the interior of the glyph defined by the non-zero winding number rule) is always to the left. This convention implies that wherever, during a traversal of a contour, there is a sharp bend to the right, there is a local negative minimum of curvature, and, conversely, wherever there is a sharp bend to the left, there is a local positive maximum of curvature.

It is assumed that all contours have at least approximately continuous slope and curvature except at corners and cusps, and that the noise in slope and curvature can be eliminated by simple heuristics.

A glyph is perceived as having natural parts. For example, a 'T' in a serif font (see FIG. 2) is perceptually broken up into two top serifs 10 and 12, a bottom serif 14, a horizontal stem 16, and a vertical stem 18 which ends in a T-junction with horizontal stem 16. Each of these parts of the T is a stroke in the sense of the definitions given above. Any glyph created by actual or simulated brush movements can be dissected into component strokes. As indicated above, strokes in a font are designed to be repetitious, or to be regular, and these regularities are discovered herein by pattern classification techniques.

As implied by the definition of stroke given above, a stroke has two ends, each composed of a pair of matched dominant points (a dominant point which matches itself may be considered a pair of very close dominant points). A dominant point is either a positive local maximum of curvature, such as shown at points 20, 22, 24, etc. in FIG. 2 or a negative local minimum of curvature, such as those occurring at points 26, 28 and 30 in FIG. 2. In the 'U' shown in FIG. 3, points 32 and 34 are positive local maxima whereas points 36 and 38 are negative local minima. By contrast, minima of absolute curvature (herein called minimal points) occur between two consecutive dominant points. For instance, points 40 and 42 are representative of minimal points between dominant points 38 and 36, and 32 and 34, respectively. When the consecutive dominant points are of opposite sign, the minimal point has zero curvature and is a point of inflection. An extended segment, such as a circular arc or straight-line segment, may have minimum absolute curvature, but there can be only one region of minimum absolute curvature between two consecutive dominant points.

The definitions of matching dominant points and stroke given above mean that a stroke starts and ends at pairs of matching dominant points. Based on the signature of the dominant points, stroke endings can be classified as follows:

1. (+, +)
2. (+, −) or (−, +)
3. (−, −)

Figure 2:
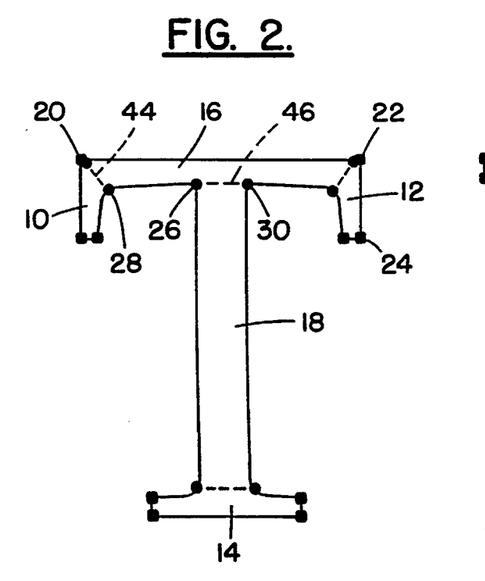
FIGS. 2, 3, and 4 illustrate glyphs from a font and enable an understanding of strokes out of which each glyph is formed.
Figure 3:
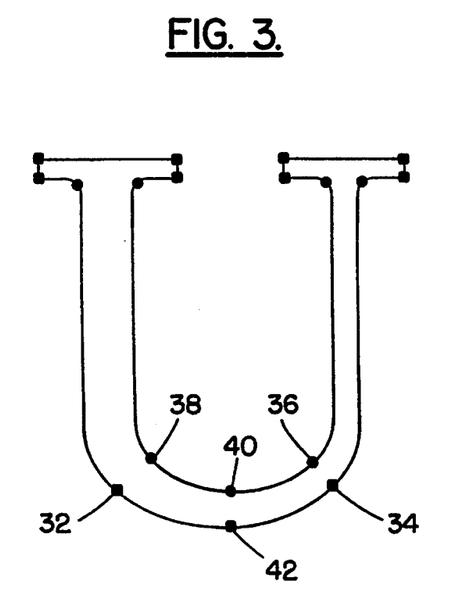
Figure 4:
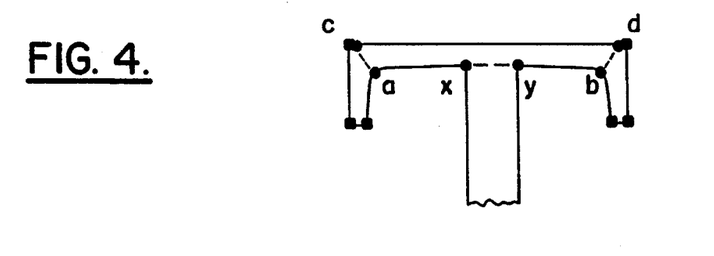

At each end of the stroke, there is either a junction with one or two other strokes, or a 'dead end'. Some types of junctions can easily be recognized:

L-junction: One dominant point is a negative minimum and the other is a positive maximum. In FIG. 2, the intersection of strokes 10 and 16 is an L-junction and the matching dominant points are 20 and 28. At an L-junction, the "incoming" direction at one dominant point is usually roughly anti-parallel to the outgoing direction at the other, and vice versa.

T-junction: The matching dominant points are both negative minima of curvature (see points 26 and 30 in FIG. 2). The rule of thumb is that the incoming direction at one dominant point is approximately collinear with the outgoing direction at the other dominant point. The outgoing direction at the first mentioned dominant point above is roughly anti-parallel to the incoming direction at the other.

n-way junction, $n >= 3$: This class includes 'X-', 'Y-', and '*' junctions. This kind of junction has n negative local minima, $n >= 3$, labeled, say, xi, x2 . . . xn, such that xi matches x2, x2 matches x3 . . . x(n−1) matches xn, and xn matches x1. At each pair of dominant points, the outgoing direction at one is roughly anti-parallel to the incoming direction of the other.

Dead End: Such a "junction" consists of one or two matching consecutive, positive local maxima of curvature or a self-matching positive local maximum.

The definition of stroke implies that a stroke has two bounding curves, each starting and terminating at dominant points. It can be shown that between the two ends of each bounding curve of any stroke, there is a point where the absolute value of curvature has a local minimum. Such a point may be a zero-crossing of curvature, or may lie on an extended segment of constant curvature, such as a straight-line segment. Such a point is called a minimal point.

The procedure to decompose a glyph into strokes is schematically as follows: First locate the dominant and minimal points on each contour. Label each such point by the contour on which it lies and note the directed tangent at that point such that ink is to the left of its direction. Draw the relative neighborhood graph (RNG) of these point (see, G. T. Toussaint, "The Relative Neighborhood Graph of a Finite Planar Set" Pattern Recognition, 12, 261–268, 1980, for the definition, and K. Supowit, "The Relative Neighborhood Graph with an Application to Minimum Spanning Trees", Journal of the ACM, 30, 428–448, 1983 for an optimal algorithm for computing the RNG). For each point p in the RNG, starting with an empty set of contours C, sort the RNG edges at p in order of increasing length. For each RNG edge pq at p, in order of increasing length, if at least one of p and q is a dominant point, and p and q are to the left of each other, and no contour in C crosses pq, then declare p and q matched and insert the contour of q into the set of contours C. Note that a dominant or minimal point may be matched to zero or more points by this procedure. Dominant points which remain unmatched at the end of this procedure are matched to themselves.

Connect each pair of matching dominant points by edges. An edge may have two labels, left and right, denoting that it has been swept in the left and/or right directions. Initially, the label of each edge is empty. For each edge, start with a line segment coincident with that edge, and move it in a direction that it has not been labeled with such that:

1. its end points always touch either a boundary of the glyph or an edge;
2. the line segment does not intersect the boundary, is not tangential to the boundary at any point, and always lies "in the ink";
3. the line segment does not intersect an edge at any time.

Stop when any of these conditions is not obeyed. The maximal area swept by the variable-length, variable-orientation line segment under these conditions is a stroke. It terminates in a different edge from which it started. When the sweep terminates, the edge's left or right label (as appropriate) is turned on. When all edges have both their labels turned on, the interior of the glyph will have been completely dissected into strokes.

Normalized Stroke Descriptor

As mentioned above, this invention is based on the fact that many strokes in any given font can be seen to be nearly identical after appropriate translation and scaling.

Figure 5:
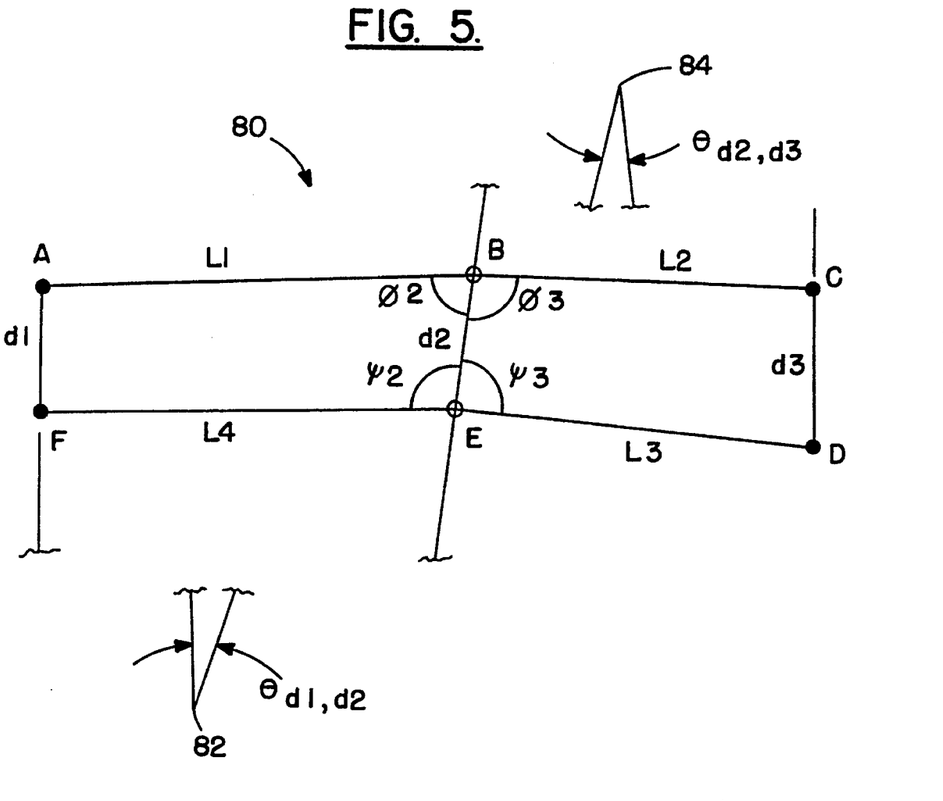
FIG. 5 is a generalized showing of a stroke, illustrating the positioning of the dominant points that describe contour limits of the stroke and minimal points that lie between them on the contour.

Let such a set of strokes be called S. By a normalized, or canonical, stroke descriptor of an element of S, is meant a parametric description of a stroke that is nearly identical to normalized descriptors of all other elements of S. A normalized stroke descriptor enables comparison of one stroke with another in a translation-, rotation-, reflection- and scale-independent manner. It further makes explicit any regularities present in the font. The structure of a normalized stroke descriptor is specified below:

In FIG. 5, a typical stroke is shown with lines joining matching dominant points (A, F) and (C, D) and minimal points B and E on the contour between (A, C) and (D, F) respectively. Also joined are A and B, B and C, D and E, and E and F. In order to compute a normalized descriptor for the stroke of FIG. 5, the dominant point with the maximum absolute curvature is first selected. If two or more of the dominant points have the same maximum absolute curvature, the tie is attempted to be broken by selecting the dominant point farthest from the minimal point on its side of the stroke. If the tie is still not broken, the dominant point is chosen for which the angle between the line to the minimal point on the same side and the line to the matching dominant point is greatest. Finally, if the tie is still not broken, one of contenders is chosen arbitrarily. The selected point's coordinates are noted. The stroke is then translated such that the selected point is at the origin. Let A be the selected point and F its matching dominant point. The stroke is rotated anti-clockwise about the origin until AF is aligned with the positive y axis, and the angle of rotation is noted. The stroke is then scaled such that the length of AF is 1 unit, and the scaling factor is noted. Note that a linear scaling has been performed. Finally, the stroke is mirror reflected through the y-axis, if necessary, so that the body of the transformed stroke is entirely to the right of the y-axis. It is noted whether reflection was necessary.

The curvatures at the dominant points A, C, D, F are affected as follows by the operations of translation, rotation, reflection and scaling: they are unaffected by translation and rotation; reflection causes a change of sign, and scaling by a factor of f causes curvature to be multiplied by a factor of 1/f.

After the above operations, A is at (0,0) and F at (0,1). A vector of 16 elements is then constructed, which forms the normalized stroke descriptor: $[x_B, y_B, x_C, y_C, x_D, y_D, x_E, y_E, \gamma(A), \gamma(C), \gamma(D), \gamma(F), \kappa(A), \kappa(C) \kappa(D),$ and $\kappa(F)]$, where $x_p$ and $y_p$ denote the transformed x and y coordinates, respectively, of the point labeled P, $\gamma(P)$ denotes the transformed slope at P in the range $[-\pi, +\pi]$ and $\kappa(P)$ denotes the transformed curvature at P. The translation, rotation, scaling and reflection parameters required to normalize the stroke are also saved and will be used as part of the glyph description and in the reconstruction of the stroke.

The normalized stroke descriptor is a translation-, rotation-, reflection- and scale-invariant mapping of a stroke. The descriptor is unambiguous, and given the transformation parameters mentioned above, a unique stroke can be reconstructed from it whose descriptor is the same as the input descriptor.

Classification of Normalized Stroke Descriptors

The recurrences of strokes in a font can be exploited to obtain considerable data compression. These recurrences are made more explicit by normalizing (that is, computing the normalized stroke descriptors of) each stroke of each glyph in the font, and subjecting the collection of all normalized strokes to a classification procedure. The classification procedure is also termed a categorization or clustering procedure. It must have the following properties:

1. Given a set of N normalized stroke descriptors, it must partition the set into some number of groups, such that descriptors in any one group are more similar to each other than they are to descriptors in any other group. Any definition of similarity that appeals to intuition is acceptable.
2. The procedure must be unsupervised and self-training.
3. The procedure must output, for each group or class of stroke descriptors, a prototypical descriptor which reflects the central tendency of the group and best represents it. Also, for each input stroke descriptor, the procedure must output a pointer to the group to which it was assigned.

Clustering methods available in the literature can be adapted to meet the criteria set out above. Among them are statistical clustering techniques (A. K. Jain and R. C. Dubes, Algorithms for Clustering Data, Prentice-Hall, 1988), Voronoi-diagram based clustering methods (N. Ahuja, "Dot Pattern Processing Using Voronoi Neighborhoods", IEEE PAMI-4, pp. 336–343, 1982), and several neural-network and connectionist classifiers such as those employed in radar signal classification (James A. Anderson et al., "Radar Signal Categorization Using a Neural Network", in C. Lau (ed.), Neural Networks: Theoretical Foundations and Analysis, IEEE Press, 1992).

For the purposes of this invention, a combination is used of a relative neighborhood graph-based method similar to C. T. Zahn's method based on the minimum spanning tree (C. T. Zahn, "Graph-Theoretical Methods for Detecting and Describing Gestalt Clusters", IEEE Trans Comp., C-20(1), 68–86, 1971), and the ART-2A technique due to Grossberg (see, e.g., S. I. Gallant, "Neural Network Learning and Expert Systems", the MIT Press, 1993). In this method each of $(x_B, y_B)$, $(x_C, y_C)$, $(x_D, y_D)$, $(x_E, y_E)$ is clustered separately, and the curvatures are treated as 4-vectors. The clustering technique for coordinates is described below and the clustering algorithm for curvatures is described in the subsection below entitled "Algorithm for Creating a Font Descriptor".

The relative neighborhood graph, like its subgraph, the minimum spanning tree, is a connected graph, i.e., there is a path from any node to any other node. The values $(x_B, y_B)$, $(x_C, y_C)$, $(x_D, y_D)$, $(x_E, y_E)$ are plotted in turn, for each of the stroke descriptors and the relative neighborhood graph is drawn on these points. The edges are pruned using the following rule: for an edge pq, if either the circle of radius pq centered at p or the circle of radius pq centered at q does not contain any point, then retain pq else remove it. Find the connected components of the resulting graph by a depth-first search procedure (see Udi Manber, "Introduction to Algorithms: A Creative Approach", Addison-Wesley, 1989, p 192). Label each component as $I_j$, where I is B, C, D, or E as the case may be, and j is the serial number of the component. The sequence of labels for the B, C, D and E coordinates forms one part of the cluster identifier (ID) of each stroke descriptor.

The other part is derived by clustering the 4-vector curvature and 8-vector tangents of each stroke descriptor by the ART-2A method of Grossberg (see, e.g., S. I. Gallant, cited above). An explicit description of the algorithm is found below in the subsection which deals with the creation of a font descriptor.

clusters. The glyph data refers to this information in order to describe the structure of each glyph in terms of strokes.

The following is a specification of a font descriptor in Backus-Naur form:

```
<Font_Descriptor> ::= BeginFont <Font_Name>
                              BeginCoordClusters
                           'B' coord_spread+
                           'C' coord_spread+
                           'D' coord_spread+
                           'E' coord_spread+
                                  EndCoordClusters
                                  BeginSlopeClusters
                           <tangent_spread>+
                                  EndSlopeClusters
                                      BeginCurvatureClusters
                           <curvature-spread>+
                                      EndCurvatureCluster
                                  BeginClusters
                           VECTOR_6+
                                  EndClusters
                                  <Glyph>*
                              EndFont;
<Font_Name>      ::= CHAR_STRING;
<coord_spread>   ::= <coordinates> <spread>;
<coordinates>    ::=     FLOATING_POINT_NUMBER FLOATING_POINT_NUMBER;
<spread> °::= FLOATING_POINT_NUMBER;
<curvature_spread> ::= <curvature_vector> <spread_vector>;
<curvature_vector>  ::= VECTOR_4;
<tangent_vector>    ::= VECTOR_8;
<tangent_spread>    ::= <tangent_vector> <tangent_vector>;
<tangent_vector>    ::VECTOR_8;
<tangent_vector>    ::= VECTOR_8;
<Glyph>    ::= BeginGlyph <unicode> <setwidth>
                              <num_strokes>
                              <stroke_graph>
                              <stroke_instance>+
                           EndGlyph;
<stroke_graph>   ::= <adjacency_row>*;
<adjacency_row>  ::= <stroke_junction>* END_OF_ROW;
<stroke_junction>   ::= <stroke_number> <side> <side> <junction_type>;
<side>      ::= 1|2|3|4;
<unicode>   ::= UNSIGNED_4BYTE_INT;
<setwidth>  ::= UNSIGNED_2BYTE_INT;
<stroke_number>  ::= UNSIGNED_BYTE;
<junction_type>  ::= 'D'|'L'|'I'|'T'|'I'|'Y';
<stroke_instance>   ::= <stroke_cluster>(<reflection>) |
                              <stroke-cluster><parameter-list>;
<parameter_list> ::= (<translation> <rotation> <scale> <reflection>);
<stroke_cluster> ::= UNSIGNED_2BYTE_INT;
<translation>    ::= SIGNED_2BYTE_INT SIGNED_2BYTE_INT;
<rotation>       ::= UNSIGNED_2BYTE_INT;
<scale>          ::= FLOATING_POINT_NUMBER;
<reflection>     ::= 0|1;
```

The above procedure results in 6 sets of clusters. Each normalized stroke is described by 6 integers. This number can be reduced to one by labelling unique combinations of the 6 cluster numbers with a single integer (i.e. the cluster number of the stroke). All the cluster combinations that occur in the font .are described in the font descriptor header.

Structure of the Font Descriptor

The font descriptor contains all the information obtained by analyzing the glyph outlines as discussed above. Due to the effort made to eliminate as much redundancy as possible, it is expected to be much smaller in size than the corresponding conventional-format font from which it is computed. The source font may be recovered with very little loss by using the reconstruction algorithm discussed later.

The font descriptor consists of two major parts: cluster data and glyph data. The cluster data contains information about the stroke descriptor classes, and slope and curvature Algorithm for Constructing a Font Descriptor A font format (as presently commercially available) essentially consists of some global data and a sequence of data structures related to the glyphs in the font. The physical arrangement of these components, and the contents of the global and glyph data as well as the presence or absence of features such as data encryption and compression may vary. Data about a glyph includes outline data with one or more contours, perhaps contained within one another, each contour described in a representation such as quadratics, B-splines or a sequence of cubic Bezier curves. Font specific procedures enable retrieval of global data such as the name of the font; the resolution of the outline data (dots per em); the number of glyphs in the font and a list of unicodes represented; and the outline data and setwidth for the next glyph in the font.

The algorithm for constructing the font descriptor takes the font and the procedures for accessing global and glyph data, as inputs, and outputs a descriptor for the font. The algorithm is as follows:

1. Retrieve the FontName, the resolution and the number of glyphs from the font.
2. In the ensuing, the following definitions for local minimum and maximum respectively, are used:

$x(t)$ is a local minimum of x if and only if $x(t-\delta) >= x(t) <= x(t+\delta)$, and $x(t)$ is a local maximum of x if and only if $x(t-\delta) <= x(t) <= x(t+\delta)$, where $\delta$ is an infinitesimal quantity. By this definition, a local minimum or local maximum may hold over an extended interval of t. When every point in an interval is a local minimum, the whole interval is considered a single local minimum. Likewise, when every point in an interval is a local maximum, the whole interval is considered a local maximum.

A zero of curvature is a point on, or an extended interval of, a contour where the curvature is zero.

For each glyph in turn, procedures A through D below are performed:

A. Finding the dominant and minimal points:
   Let table_of_points be an initially empty table whose entries contain the following information:
   1. Point Number
   2. Coordinates (x,y)
   3. Number of the Contour on which point lies
   4. Whether Negative or Positive Dominant point or Minimal Point
   5. Next Dominant Point's Number
   6. Previous Dominant Point's Number
   7. Next Minimal Point's Number
   8. Previous Minimal Point's Number
   9. Number of Matching Point, if any
   10. Incoming slope (in direction of traversal)
   11. Outgoing slope
   12. Curvature cursigpt= 1; (cursigpt is a counter)
   For each contour in the outline U of G:
   a. Find all the local minima, maxima and zeros of curvature;
   b. If a local minimum has negative curvature, create an entry for it in table_of_points and fill in its Point Number (cursigpt++), its coordinates and contour number and label it as a negative dominant point;
   else if a local maximum has a positive curvature, create an entry for it in table_of_points and fill in its Point Number (cursigpt++), its coordinates, slopes, curvature and contour number and label it as a positive dominant point;
   else if a local minimum has positive curvature or a local maximum has negative curvature, create an entry for it in table_of_points and fill in its Point Number (cursigpt++), its coordinates, slopes, curvature and contour number and label it as a minimal point;
   For every zero of curvature make an entry in table_of_points and fill in its Point Number (cursigpt++), its coordinates, slopes, curvature and contour number and label it as a minimal point.
   Go through table_of_points again and fill in the present point's slopes and curvature, the next dominant point's number, previous dominant point's number, next minimal point's number, and previous minimal point's number.

B. Matching the dominant points:
   Draw the relative neighborhood graph RNG of the set V of dominant and minimal points.
   Let table_of_matched_pairs be an initially empty table each of whose entries has the following structure:
   1. Matched Pair Number (curmatchedpair++);
   2. Matched pair (i, j), (i<= j), the numbers referring to entries in table_of_points in A above;
   3. The stroke numbers stroke0 and stroke1 on the two sides of the matched pair;
   4. Whether there is a T-junction at this pair (T);
   5. Whether stroke (0 or 1) has: a T-junction at this pair (Tstroke).
   6. Side numbers side0 and side1—side0 of stroke0 meets side1 of stroke1 at this matched pair.

Let matchedpairnum= 1.
   For each point p in V:
   a. Let C be an empty set.
   b. Sort the edges at p by length.
   c. For each RNG edge pq at p in order of increasing length
      if ((either p or q is a dominant point) and
      (p and q are to the left of each other) and
      (pq does not cross any contour whose # is in C)) then:
      declare p and q matched;
      insert the contour# of q into C;
      create a new entry in table_of_matched_pairs;
      let number(p) and number(q) be the serial numbers of points p and q in table_of_points (A above);
      Switch p and q around if number(p)> number(q);
      insert (number(p), number(q)) as the matched pair in the entry in table_of_matched_pairs and increment matchedpairnum.
   for (i=1; i<= cursigpt; i++)
      if ((i is not present in either column of the table-of-matched-pairs)
      && (i is a positive dominant point))
      create a new entry in table-of_matched_pairs;
      insert (i,i) as the matched pair in the entry and increment matchedpairnum.

C. Delimiting the Strokes:
   This procedure is done for each matched pair in the table_of_matched_pairs.
   Given an ordered pair of matching points which begins a stroke, the task is to identify the ordered pair of matching points which forms the other end of the stroke.
   Let V be the set of all dominant and minimal points. If a is in V, next(a) is the next member of V, traversing the contour from a in the canonical direction. If a is in V, prev(a) is the next member of V, traversing the contour from a in the direction opposite to the canonical direction. Also, if a is in V, match(a) is a subset of V each of whose elements match a. M(a,b) is true if b is in match(a).
   A sequence of points (dominant and/or minimal) (a1 a2 a3 ... an) is said to be a ring if a1 matches a2, a2 matches a3 ... an matches a1. Those vertices which are matched in a ring will also be connected in the Delaunay triangulation, a supergraph of the relative neighborhood graph.
   There is said to be a T-junction at x if x is a negative minimum, there is a negative minimum mx which matches x, and the only negative minimum matches of x and mx respectively are mx and x, and both x and mx are to the left of y which matches prev(x).

```
strokenum = 0;
for each matched pair (p,q) (p <= q) in table of matched
pairs:
{
/*If (p,q) be an ordered pair of matched points, p has
outward direction of traversal and q has inward direction
of traversal. The following algorithm attempts to return
an ordered pair corresponding to the other end of the
stroke traversed from p in the canonical direction.
*/
    increment strokenum;
    Search for the entry e with matched pair(p,q) in
table_of_matched_pairs.
        if ((next(p) == q) && (p is a positive dominant point)
&& (q is a positive dominant point)    || (p == q))
            {e.stroke0 = strokenum; e.stroke1 = 0; e.T = 0;}
        else
        if ((next(q) == p) && (p is a positive dominant point)
&& (q is a positive dominant point))
            {e.stroke1 = strokenum; e.stroke0 = 0; e.T = 0;}
        if (pq.....) is a ring then
        {
        if (the ring is not a triangle and p and q do not have
        matches with other vertices in the ring) then
            {
        triangulate it: choose one of the vertices and match
it with all others except the vertices adjacent to it in
the ring;
        create new entries for each of these matches in
table_of_matched_pairs.
            }
        if pqr is a triangle in this triangulation, and qr
makes a lesser angle with pq than pr then
                qr is the opposing side to pq, else
                pr is the opposing side to pq.
        Call the opposing side xy. If (x > y) swap x and y.
        Search for an entry in table_of_matched_pairs for
(x,y). Call it f.
        If the left side of (x,y) falls within the stroke then
{f.stroke0 = strokenum; f.T = 0;)
            else {f.stroke1 = strokenum;f.T =0;}
        }
    else
        {
        aflag = bflag = FALSE;
        found = FALSE;
        while (not found)
            {
            if (there is a T-junction at next(a)) then
                {
            if (next(a) < match(next(a))
                search for (next(a), match(next(a));
            else search for (match(next(a)), next (a)) in
                    table_of_matched_pairs;
            call the resulting entry f;
            if (the stroke is to the left of f.matched_pair)
                {
                    f.stroke0 = strokenum;
                    f.T = 1;
                    f.Tstroke = 1;
                }
            else
                {
                f.stroke1 = strokenum;
                f.T = 1;
                f.Tstroke = 0;
                }
            a = match (next(a));
            aflag = TRUE;
                }
            else a = next(a);
        if (there is a T-junction at prev(b)) then
            {
            search for    (prev(b),    match(prev(b))    or
(match(prev(b), prev(b)) in table_of_matched_pairs;
            call the resulting entry f;
            if (the stroke is to the left of f.matched_pair)
                {
                    f.stroke0 = strokenum;
                    f.T = 1;
                    f.Tstroke = 1;
                }
            else
                {
                    f.stroke1 = strokenum;
                    f.T = 1;
                    f.Tstroke = 0;
                }
            b = match(prev(b));
            bflag = TRUE;
            }
        else b = prev(b);
        if (M(a,b))
            {
            found = TRUE;
            if (a < b) search for an entry with (a,b) in
table_of_matched_pairs;
                else search for an entry with (b,a) in
table_of_matched_pairs;
            Call the resulting entry f;
            if (the stroke is to the left of f.matched_pair)
                {
                    f.stroke0 = strokenum;
                    f.T = 0;
                    f.Tstroke = 0;
                }
            else
                {
                    f.stroke1 = strokenum;
                    f.T = 0;
                    f.Tstroke = 0;
                }
            }
        else
        if (aflag)
            {
            aflag = False; a = next(a);
            if (M(a, b))
                {
                if (a < b) search for an entry with (a,b) in
table_of_matched_pairs;
                else search for an entry with (b,a) in
table_of_matched_pairs:
                Call the resulting entry f;
            if (the stroke is to the left of f.matched_pair)
                {
                    f.stroke0 = strokenum;
                    f.T = 0;
                    f.Tstroke = 0;
                }
            else
                {
                    f.stroke1 = strokenum;
                    f.T = 0;
                    f.Tstroke = 0;
                }
            }
            found = TRUE;
            }
            }
        else
        if (bflag)
            {
            bflag = False; b = prev(b);
            if (M(a,b))
                {
                if (a< b) search for an entry with (a,b) in
table_of_matched_pairs;
                else search for an entry with (b,a) in
table_of_matched_pairs;
                Call the resulting entry f;
        if (the stroke is to the left of f.matched_pair)
                {
                f.stroke0 = strokenum;
                f.T = 0;
                f.Tstroke = 0;
                }
            else
                {
                f.stroke1 = strokenum;
```

```
        f.T = 0;
        f.Tstroke = 0;
        }
        found = TRUE;
    }
}
```

Let the matching pairs forming the two ends of a stroke be [A, F] and [C, D] (as in FIG. 5). Then there is exactly one point or extended segment which has minimum absolute curvature between A and C and similarly one point of minimum absolute curvature between D and F. In the case of an extended segment, the midpoint of the segment is considered as the representative minimal point. Let B and E be the minimal points on the curvilinear segments AC and DF respectively.

D. Normalizing stroke descriptors:

For each stroke s in each glyph the following procedure is performed:

Let $r_1 r_2 r_3 r_4 r_5 r_6 r_1$ be the clockwise delineation of a stroke, with $(r_1, r_6)$ and $(r_3, r_4)$ as matching pairs of dominant points and $r_2$ and $r_5$ as minimal points on the contour segments $r_1 r_3$ and $r_4 r_6$ respectively. Let (r1, r6) be matched_pair #x and (r3, r4) matched_pair #y in the table_of_matched_pairs. Let $\kappa_i$, i=1,3,4,6, be the curvature at $r_i$ and let $t_i$, i=1,3,4,6, be the tangent vector at $r_i$. Let $d_i$ be the distance from point i to the minimal point on the same side of the stroke. Let $\alpha_i$ be the angle made between the two lines incident at point i.

The maximum absolute curvature point must first be found among the $r_i$:

```
for (i=1, maxcurv = 1.0×10⁻¹²; i<=6; i++)
    if (κᵢ > maxcurv)
    {
        j=i;
        maxcurv = abs (κᵢ);
    }
```

Then check to see if there is a tie for the maximum curvature value and if so, apply the tie breaking actions in sequence:

```
for (i=1, D=1.0×10⁻¹²; 1 <=6; i++)
    if (κᵢ == maxcurv && dᵢ > D)
    {
        D = dᵢ; j = i;
    }
for (i=1, angle=1.0×10⁻¹²; i <=6; i++)
    if (κᵢ == maxcurv && dᵢ== D && (abs(αᵢ)>angle))
    {
        angle = abs(αᵢ);
        j= i;
    }
/*rⱼ is the point of maximum absolute curvature*/
/* Translate by −rⱼ*/
R·x = rⱼ·x; R·y = rⱼ·y;
for (i=1; i<= 6; i++)
    {
        rᵢ·x = rᵢ·x − R·x;
        rᵢ·y = rᵢ·y − R·y;
    }
```

\* The following table gives the possible values of j and the subscript of its matching dominant point:

|   |   |
|---|---|
| 1 | 6 |
| 3 | 4 |
| 4 | 3 |
| 6 | 1 |

Let l be the subscript of the matching dominant point of j in the above table. The angle made by $r_j r_L$ to the y-axis is $\theta = \pi/2 - \tan^{-1}((r_L.y - r_j.y)/(r_L.x - r_j.x))$, where $\tan^{-1}()$ range from $-\pi$ to $+\pi$.

```
*\
pi= 3.1415926536;
theta= pi * 0.5−atan((r_L.y−rⱼ.y)/(r_L.x−rⱼ.x));
find the entries e and f of matched pairs # x and y
  respectively;
```

```
if (j == 1)
    if this stroke is to the left of matched pair # x then
        e.side0 = 1;
    else e.side1 = 1;
else
    if the stroke is to the left of matched pair # y then
        f.side0 = 3;
    else f.side1 = 3;
for (i=1;i<=6;i++)
{
    X = rᵢ·x * cos(theta) − rᵢ·y * sin(theta);
    Y = rᵢ·x * sin(theta) − rᵢ·y * cos(theta);
    rᵢ·x = X;
    rᵢ·y = Y;
}
factor = r₁·y;
for (i=1;i<=6;i++)
{
    rᵢ·x = factor * rᵢ·x;
    rᵢ·y = factor * rᵢ·y;
    κᵢ = κᵢ/factor;
}
/*The normalized stroke descriptor is
[r₂r₃r₄r₅κ₁κ₃κ₄κ₆t₁t₃t₄t₆]*/
```

E. Building the Stroke Graph for a Glyph

Given the table_of_points and the table_of_matched_pairs, the task is to create a table of strokes which has the following structure:

Stroke0 | Stroke1 | Side0 | Side1 | Junction_type

A row in this table means that side0 of stroke0 meets side1 of stroke1 in a junction of type junction_type. Although the grammar allows for several junction_types, it is only of concern as to whether it is 'T' or otherwise.

For each matched pair in the table_of_matched_pairs, copy the stroke numbers stroke0 and stroke1, and side numbers side0 and side1. If the matched_pair entry has T=1, the junction type is 'T' else it is 'L'.

Finally sort the table with stroke0 as primary key and stroke1 as secondary key. From this table, the adjacency_rows in the font descriptor are derived in straightforward manner.

F. Clustering the Stroke Descriptors:

Cluster each of the components of the normalized stroke descriptors separately. For each of the components $r_2, r_3, r_4, r_5$ use the following procedure:

1. Plot the $r_i$ for all the normalized stroke descriptors in the plane and draw the relative neighborhood graph by Supowit's method cited above.

2. Find the distance between all pairs of points plotted.

3. For each edge pq in the relative neighborhood graph, if there is no point which is nearer than either p or q or both than the length of edge pq, then retain edge pq, else remove it.

4. Find the connected components of the resulting graph using depth-first search. Each connected component is a cluster in the ith dimension.

5. Find the centroid of each ,connected component, i.e., the average x and y coordinates over all the members of the component, and the maximum distance from the centroid to any member of the component. Call these the cluster center and spread.

The above procedure derives r2 clusters, r3 clusters, r4 clusters and r5 clusters.

The curvatures and tangents at the four dominant points are clustered as 4- and 8-vectors. To cluster the curvatures and tangents, use the ART-2A method whose algorithm is given on p. 148 of S. I. Gallant, "Neural Network Learning and Expert Systems", The MIT Press, 1993. The curvatures associated with a single stroke! descriptor are considered to be a 4-vector. A judicious choice of parameters:

$\alpha$=positive number $\leq 1/\sqrt{P}$, and $\beta$=small positive number $\theta$=normalization parameter with $0 < \theta < 1/\sqrt{p}$, and $\rho$=vigilance parameter, with $0 \leq \rho < 1$, is made to insure a satisfactory clustering of the curvatures. By making a final pass over the input data, the spreads of each cluster can be obtained as a 4-vector.

A similar procedure is used for the tangent vectors at the four dominant points.

G. Building the Font Descriptor:

The structure of the font descriptor is given above. Here is indicated how the variable contents of the font descriptor are computed.

FontName is an input character string parameter. Sections B and F above, derived clusters r2 through r5. They are recorded as the 'B', 'C', 'D', and 'E' CoordClusters. In Section F, step 5, the cluster center and spread were derived. Later in Section F the ART-2A method was used to cluster the curvatures and tangent vectors at A, C, D, and F and to obtain, for each cluster, a center and a spread. For each normalized stroke, the coordinate clusters to which each vector belongs (other than A and F) are noted. Unique combinations of clusters are then given different "supercluster" numbers. These "superclusters" are described in the construct BeginClusters . . . EndClusters in the font descriptor.

The input font format identifies each glyph by a code in some glyph identification system, for which a translation exists to the Unicode system, the latter being more inclusive than any other extant system. The font also contains the setwidths for the glyphs. From Section C above, the total number of strokes in each glyph are obtained. The strokes in each glyph are normalized as described in Section D, and the stroke graph for each glyph is computed as described in Section E.

Depending on whether the stroke makes a T-junction or otherwise with a previously mentioned stroke the following information computed in Section D is used:

(i) translation, rotation, scale and reflection parameters (the first stroke in the glyph or a stroke isolated from previously mentioned strokes);

(ii) reflection parameter (a non-T-junction);

(iii) all of the parameters in (i) above (T-junction).

This concludes all the variable fields in the font descriptor.
Reconstructing the Font from the Font Descriptor The task here is to recover the outlines of all the glyphs in the font along with their Unicodes and setwidths. The procedure is as follows:

Read in the CoordClusters, CurvatureClusters and SlopeClusters. Also read in the "Clusters" data.

Let X be an initially empty table whose structure is as follows:

1. Stroke number
2. Coordinates of A, C, D and F.
3. Curvatures at A, C, D, and F.

While there is still glyph data to be read

{
read in the data for the next glyph;
extract from it the unicode, setwidth, number of
  strokes, and the strokegraph;
for each stroke determine whether all its instantiation
  parameters have been given, or only its reflection
  parameter;
if all its instantiation parameters have been given,
  Use the clusters parameter to get the normalized
  coordinates, curvatures and slopes.
  Perform the translation, rotation, scaling and reflection
  operations indicated by the parameters and get the
  coordinates of all dominant and minimal points A, B, C,
  D, E and F. Also use the scale factor to get the
  curvature and rotation parameter to get the slope at the
  dominant points A, C, D and F. In table X, make an entry
  with the present stroke #, the coordinates of A,C, D and
  F, and the curvatures at A, C, D and F. Follow the
  procedure given below to interpolate the outline between
  A and C, D and F.
if only the reflection parameter is given,
  consult the stroke graph for a row in which this stroke
  occurs. The row indicates the stroke which has a junction
  with the present one. The information in the row also
  includes which side of the present stroke meets which side
  of the other. From table X, two points of the present
  stroke are known. Along with the reflection parameter
  given, this suffices to determine all the points A', B',
  C', D', E' and F' of the present stroke. Again note in X,
  the present stroke's number, the coordinates of A', C', D'
  and F' and the curvatures at these points.

Interpolation Procedure:

Each major side of a stroke has two dominant points at its ends and a minimal point in between, the coordinates of which and the curvatures and slopes at its ends all being known.

Consider two cubic Bezier segments $r^{(1)}(u)$ and $r^{(2)}(u)$, one of them spanning from one end to the minimal point, and the other from that minimal point to the other end. The following constraints exist:

1. The slope and curvature are continuous at the minimal point;
2. The slopes and curvature at the ends are known.

The Bezier segments have the form:

$$r^{(1)}(u)=(1-u)^3 r_0^{(1)}+3u(1-u)^2 r_1^{(1)} +3u^2(1-u)r_2^{(1)}+u^3 r_3^{(1)}$$

$$r^{(2)}(u)=(1-u)^3 r_0^{(2)}+3u(1-u)^2 r_1^{(2)} +3u^2(1-u)r_2^{(2)}+u^3 r_3^{(2)}$$

Continuity of the curve demands that:

$$r_3^{(1)}=r_0^{(2)}$$

Continuity of slope at $r_3^{(1)}$ is expressed by $$3/\alpha_1(r_3^{(1)}-r_2^{(1)})=3/\alpha_2(r_1^{(2)}-r_0^{(2)}) \quad (1)$$

where $\alpha_1$ and $\alpha_2$ are constants to be solved for.

Curvature continuity at $r_3^{(1)}$ is expressed by $$6a_1(r_0^{(2)}-2r_1^{(2)}+r_2^{(2)})=6\alpha_2 (r_1^{(1)}-2r_2^{(1)}+r_3^{(1)}) \quad (2)$$

The slopes at $r_0^{(1)}$ and $r_3^{(2)}$ are constrained to known values:

$$3/\alpha_1(r_1^{(1)}-r_0^{(1)})=\text{tangent unit vector at } r_0^{(1)} \quad (3)$$

$$3/\alpha_2(r_3^{(2)}-r_2^{(2)})=\text{tangent unit vector at } r_0^{(2)} \quad (4)$$

Finally the curvatures at $r_0^{(1)}$ and $r_3^{(2)}$ are constrained to known values:

$$6\alpha_1(r_0^{(1)}-2r_1^{(1)}+r_2^{(1)})=\text{curvature at } r_0^{(1)} \quad (5)$$

$$6\alpha_2(r_0^{(2)}-2r_2^{(2)}+r_3^{(2)})=\text{curvature at } r_3^{(2)} \qquad (6)$$

These six equations in six unknowns are simultaneously solved to yield two Bezier segments which have the desired continuity properties and known slope and curvature values at the ends.

Both sides of each stroke are treated in this manner.

At each junction between strokes, the two curves on each side at the respective matching pair ends are joined and eliminate the matching pair. Continuity of slope and curvature can be insured by averaging the coordinates of the corresponding ends of the two strokes and iterating the above procedure.

The closeness of the reconstructed outline to the original can be judged by the fact that both outlines pass through the dominant and minimal points, that both outlines have the same curvature and slope values at dominant points and that they have curvature and slope continuity at all but corners and cusps.

SYSTEM FOR TRANSMITTING FONTS IN TEXTUAL DOCUMENTS

Figure 6:
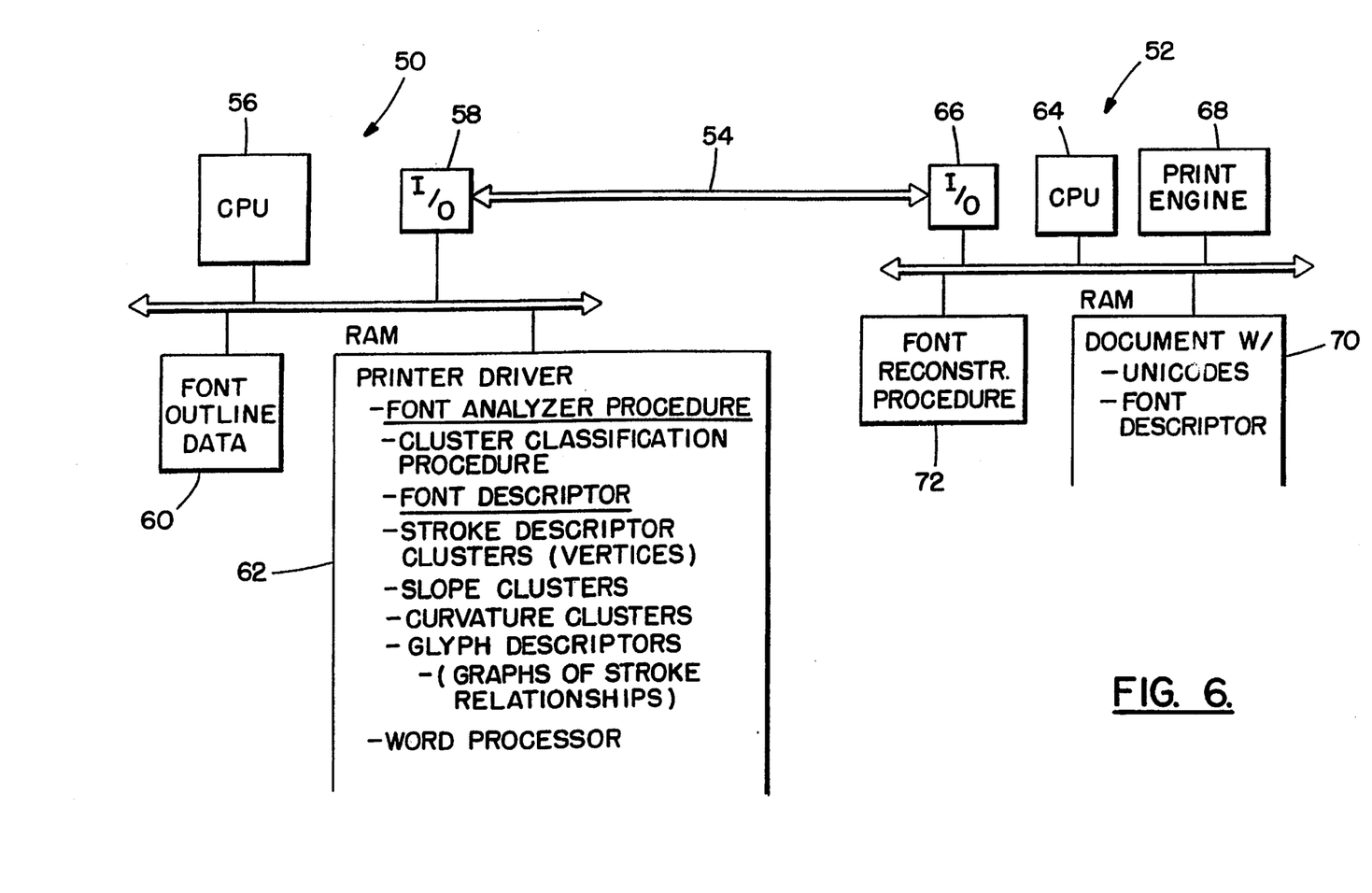
FIG. 6 shows a block diagram of a system adapted to perform invention hereof.

FIG. 6 illustrates a system for carrying out the invention. A processor 50 communicates with a printer 52 via a communication link 54. Processor 50 includes a central processing unit (CPU) 56, an input/output module 58 and a memory 60 which includes font outline data. A random access memory (RAM) 62, includes (among other operating software) a printer driver program which implements the font analysis, compression and transmission procedures. The printer driver includes a font analyzer procedure and a clustering procedure which, together, output a font descriptor which is the encoded description of the font. The font descriptor includes tables of curvature clusters, slope clusters, stroke descriptor clusters, and glyph descriptors. As above indicated, the clusters and glyph descriptors provide substantial data compression, based upon regularities found in font glyphs. A word processing procedure is also included in RAM 62 to enable the creation of documents and transmittal thereof to printer 52.

Through use of the font analyzer procedure, an entire font can be embedded in and transmitted with a document sent to printer 52, without substantial memory penalties. Printer 52 includes a central processing unit 64, an input/output module 66, and a print engine 68, all well known in the prior art. A random access memory 70 receives a transmitted document which includes (i) unicode values that identify included font glyphs contained within the document and (ii) the font descriptor. Through the use of the unicodes, CPU 24 is enabled to access information from the font descriptor and to reconstruct the required font glyph, using a font reconstruction procedure contained in a memory 72.

Figure 7:
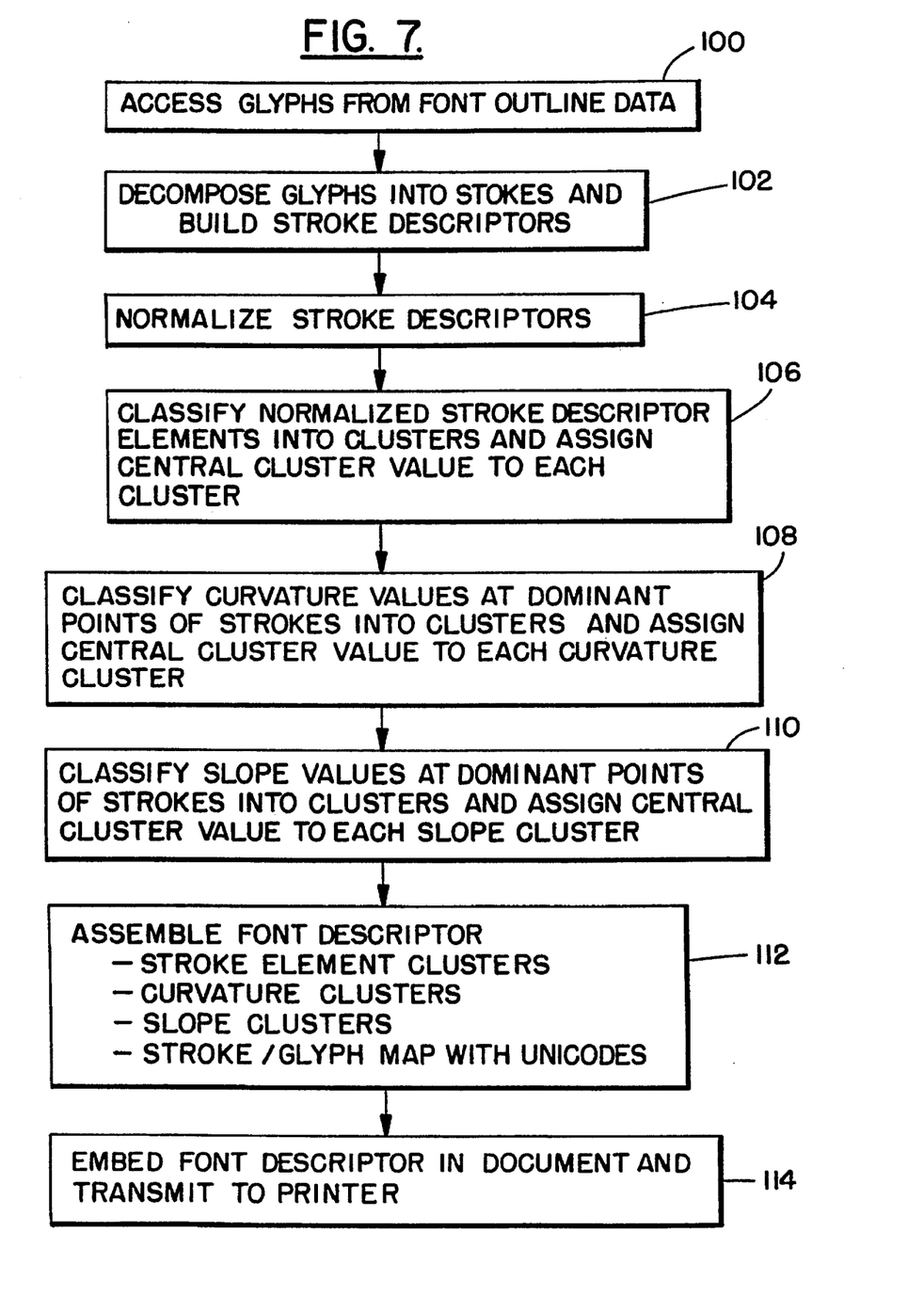
FIG. 7 is a level logic flow diagram of the method of the invention.

In summary (and as shown in FIG. 7), CPU 56, employing the font analyzer procedure within RAM 62, accesses glyphs from the font outline data in ROM 60 (box 100); determines strokes for each glyph; and builds a descriptor for each stroke (box 102). The stroke descriptor is then normalized, and classified by a clustering procedure, and is assigned to one of plural clusters (boxes 104, 106). In a similar fashion, a curvature value is determined at each dominant point and is assigned to one of plural curvature clusters (box 108). A similar action occurs with respect to the slope at each dominant point (box 110). Thereafter, individual stroke, curvature and slope values are represented by the cluster values into which they were segregated—enabling substantial compression of their representative data. When all glyphs have been subjected to the compression procedure, the compilation of a glyph/stroke map with unicodes, glyph descriptors and clusters is the font descriptor (box 112) which can be embedded in a document produced by the word processor procedure. The glyph descriptors further include transform information which enables the font reconstruction procedure to know whether a reconstructed stroke is to be used as is, rotated, translated, magnified or compressed.

When a document is fully prepared, it is transmitted to printer 52 as a series of unicodes that identify glyphs contained within the document, and with the font descriptor (box 114). At printer 52, the received unicode values allow each glyph descriptor to be recovered from the font descriptor and to thereby enable reconstruction of the glyph from its component strokes.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. A method for compressing a data font and employing the compressed data font, said method comprising the steps of:

a. selecting glyph data from a font memory;

b. analyzing said glyph data to derive strokes that, together, comprise a glyph, each stroke defined by bounding dominant points and described by stroke descriptor data;

c. grouping stroke descriptor data for glyphs comprising said font as inputs into clusters of stroke descriptor data, each cluster including all stroke descriptor data inputs which exhibit values that fall within a variance from a central cluster stroke descriptor data value, each stroke descriptor data input to a cluster assigned said central stroke descriptor data cluster value of said cluster, each cluster having an identifier;

d. assembling a font descriptor comprising at least (i) central stroke descriptor cluster values and (ii) a description of each glyph, including a glyph identifier and strokes comprising said glyph, said description comprising a series of identifiers of stroke descriptor data cluster values wherein each said stroke making up said glyph is grouped and parameters which indicate a positional or size modification of any listed stroke; and e. transmitting said font descriptor to a printer to enable a document received at said printer to be reproduced using said font.

2. The method as recited in claim 1, wherein step b. further derives a curvaturesvalue at each dominant point and step c. groups curvature values into clusters of curvature values, each cluster including curvature values that fall within a variance from a central curvature cluster value, each curvature value grouped in a cluster assigned said central curvature cluster value, and step d. includes central curvature cluster values in said font descriptor.

3. The method as recited in claim 2, wherein step b. further derives a slope value at each dominant point and step c. groups slope values into clusters of slope values, each cluster including slope values that fall within a variance from a central slope cluster value, each slope value grouped in a cluster assigned said central slope cluster value, and step d. includes central slope cluster values in said font descriptor.

4. The method as recited in claim 1 wherein said stroke descriptor data comprises identifiers of matching pairs of dominant points which occur at local positive maxima of curvature or local negative minima of curvature, and step c. groups said dominant points into sets and derives for each set, a central dominant point identifier therefor, and dominant points in a set acquiring a set's central dominant point identifier.

5. The method as recited in claim 1, wherein said transmitting step embeds said font descriptor in transmission which includes said document, said document including identifiers for all glyphs of said font that are to be used for said document.

6. The method as recited in claim 1, wherein said parameters which indicate a positional or size modification comprise translation and/or rotation and/or scale values.

7. The method as recited in claim 6, wherein said printer performs the following steps:

- employing a glyph identifier and said font descriptor to access each of a series of stroke descriptor central cluster values comprising said glyph and central curvature cluster values associated with each said stroke descriptor central cluster values;
- reconstructing said glyph from said stroke descriptor central cluster values, curvature cluster values and parameters; and
- interpolating at junctions between strokes which comprise said glyph so as to reduce discontinuities that result from use of central cluster values.

8. The method as recited in claim 7, wherein said interpolating step employs said central slope cluster values associated with a glyph in reducing discontinuities.

9. The method as recited in claim 2, wherein a stroke is bounded by two pairs of matching dominant points, one of each of said pairs of matching dominant points positioned on one of a pair of roughly parallel contours that bound said glyph of which said stroke is a part, each said dominant point located at a point on a contour of said glyph where there occurs a positive local maxima of curvature or a negative local minima of curvature, there further being a pair of matching minima points on said contours between said maxima points, each said minima point identifying an area of minimum absolute curvature between said maxima points.

10. The method as recited in claim 9 wherein said grouping step c further modifiers said stroke descriptor data by performing normalization operations thereon, said normalization operations comprising a translation of said stroke descriptor data so that a dominant point therein is located at a reference coordinate and a scaling of said stroke descriptor data to enable a boundary joining a matching pair of dominant points to exhibit a normalized value.

11. The method as recited in claim 10, wherein a normalized stroke descriptor comprises transformed coordinate values for pairs of matching dominant and minimal points.

\* \* \* \* \*